(12) United States Patent
Rodmell

(10) Patent No.: US 9,658,907 B2
(45) Date of Patent: May 23, 2017

(54) DEVELOPMENT TOOLS FOR REFACTORING COMPUTER CODE

(71) Applicant: CA, INC., Islandia, NY (US)

(72) Inventor: Mark Daniel Rodmell, Prague (CZ)

(73) Assignee: CA, Inc., Islandia, NY (US)

( * ) Notice: Subject to any disclaimer, the term of this patent is extended or adjusted under 35 U.S.C. 154(b) by 63 days.

(21) Appl. No.: 14/313,165

(22) Filed: Jun. 24, 2014

(65) Prior Publication Data

US 2015/0370690 A1 Dec. 24, 2015

(51) Int. Cl.
*G06F 9/44* (2006.01)
*G06F 11/00* (2006.01)

(52) U.S. Cl.
CPC ............ *G06F 11/008* (2013.01); *G06F 8/72* (2013.01)

(58) Field of Classification Search
CPC .... G06F 11/3616; G06F 8/70; G06F 11/3604; G06F 8/77; G06F 11/3612
USPC ........................................................ 717/124
See application file for complete search history.

(56) References Cited

U.S. PATENT DOCUMENTS

| | | | | |
|---|---|---|---|---|
| 7,856,626 B2* | 12/2010 | Abernethy, Jr. | .......... | G06F 8/72 717/116 |
| 8,701,084 B1* | 4/2014 | MacDonald | .............. | G06F 8/20 717/113 |
| 8,856,725 B1* | 10/2014 | Anderson | .................. | G06F 8/75 717/103 |
| 2006/0123384 A1* | 6/2006 | Nickell | ....................... | G06F 8/72 717/100 |
| 2008/0155508 A1* | 6/2008 | Sarkar | ....................... | G06F 8/10 717/126 |
| 2009/0070734 A1* | 3/2009 | Dixon | ....................... | G06F 8/71 717/102 |
| 2009/0144698 A1* | 6/2009 | Fanning | ................... | G06F 8/75 717/120 |
| 2011/0022551 A1* | 1/2011 | Dixon | ................. | G06F 11/3616 706/12 |
| 2011/0035726 A1* | 2/2011 | Davies | ............... | G06F 11/3604 717/110 |
| 2011/0055798 A1* | 3/2011 | Kraft | ................... | G06F 11/3604 717/100 |
| 2011/0055799 A1* | 3/2011 | Kaulgud | ............. | G06F 11/3616 717/101 |
| 2011/0252394 A1* | 10/2011 | Sharma | ............... | G06F 11/3616 717/101 |

OTHER PUBLICATIONS

Corresponding U.S. Appl. No. 14/222,045 entitled Development Tools For Logging And Analyzing Software Bugs; filed Mar. 21, 2014.

* cited by examiner

*Primary Examiner* — Duy Khuong Nguyen
(74) *Attorney, Agent, or Firm* — Sage Patent Group

(57) ABSTRACT

Methods of calculating a maintainability index are provided. The methods include, for each function in software code for an existing software product, locating errors related to the function in the software code in a common historical error database; filtering the located errors for the function based on developer experience; calculating a percentage of errors for the function based on the filtered located errors for the function and successful compiles for the function; and providing a maintainability index for the function based on the calculated percentage of errors.

16 Claims, 9 Drawing Sheets

DEVELOPMENT TOOLS FOR REFACTORING COMPUTER CODE

BACKGROUND

Various embodiments described herein relate to computer systems, methods and computer program products for software development and, more particularly, computer systems, methods and computer program products for refactoring software for computer systems.

Today's software developers typically use integrated development environments (IDEs) or interactive development environments (referred to collectively herein as "IDEs") when developing software for new applications. An IDE is a software application that provides comprehensive facilities to software developers (computer programmers) for software development. IDEs are designed to increase developer productivity by providing tight-knit components with similar user interfaces. IDEs present a single program in which all development can be done. These environments typically provide many features for authoring, modifying, compiling, deploying and debugging software.

Once code is developed and compiled, it typically has a life and at some point must be refactored. Code refactoring is the process of restructuring existing computer code, i.e., changing the factoring, without changing its external behavior. Refactoring improves nonfunctional attributes of the software. However, before starting any refactoring project, an assessment and in-depth analysis typically have to be made, discussed, and drawn out into a larger plan which defines what should be refactored.

SUMMARY

Some embodiments of the present inventive concept provide methods of calculating a maintainability index. The method includes, for each function in software code for an existing software product, locating errors related to the function in the software code in a common historical error database; filtering the located errors for the function based on developer experience; calculating a percentage of errors for the function based on the filtered located errors for the function and successful compiles for the function; and providing a maintainability index for the function based on the calculated percentage of errors.

Related systems and computer program products are also provided herein.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
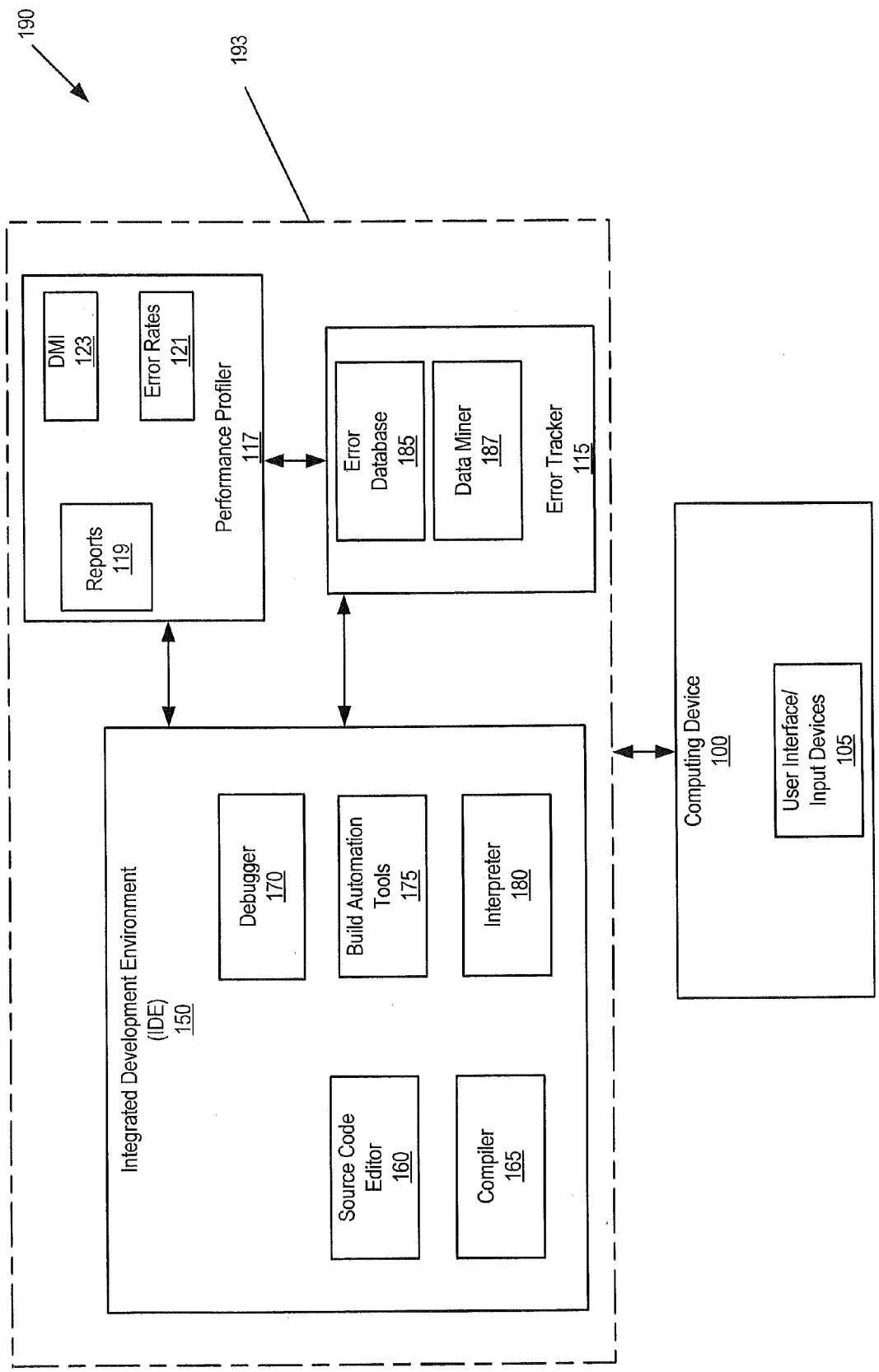
FIG. 1 is a block diagram of an integrated development environment (IDE) including a performance profiler in accordance with some embodiments of the present inventive concept.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. As used herein, "a processor" may refer to one or more processors.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As described herein, a computing system or environment may include one or more hosts, operating systems, peripherals, and/or applications. Machines in a same computing system or environment may have shared memory or resources, may be associated with the same or different hardware platforms, and/or may be located in the same or different physical locations. Computing systems/environments described herein may refer to a virtualized environment (such as a cloud environment) and/or a physical environment.

As discussed above, the need to refactor any complex system is typically mandatory as the code ages. Accordingly, some embodiments of the present inventive concept provide methods and systems that allow the order in which refactoring should be performed to be prioritized. In other words, embodiments of the present inventive concept provide functions that need to be factored in order of priority based on a dynamic maintainability index (DMI) calculated in accordance with embodiments of the present inventive concept. Thus, users have a more prioritized picture of refactoring needs, for example, a ranked list of the most difficult to maintain functions in the product as will be discussed with respect to FIGS. 1 through 10.

As will be discussed further herein, the DMI is calculated based on the function's local build and compile error frequency data stored in an historical database of errors with its resource consumption (storage) and data compiled by the performance profiler. The historical database of errors discussed in detail in commonly assigned U.S. patent application Ser. No. 14/222,045 entitled DEVELOPMENT TOOLS FOR LOGGING AND ANALYZING SOFTWARE BUGS, the disclosure of which is hereby incorporated herein by reference as if set out in its entirety. For example, the performance profiler in accordance with embodiments discussed herein may identify long running functions in the existing code that are potential bottlenecks in the code and/or consuming more than expected storage. Combined with the local build and compile error metric in the historical database discussed above, an accurate score for a function's maintainability, referred to herein as a maintainability index, can be calculated and used to prioritize refactoring needs for the product.

Conventional tools that can automate portions of the refactoring process exist. For example, klocwork provides a tool that automates portions of the refactoring processing as long as the user knows what portion of the code needs to be refactored and how to do it. Thus, according to some embodiments of the present inventive concept, a user may be informed of the refactoring priorities and, therefore, the user may not have to determine this themselves.

Similarly, conventional tools may also provide a maintainability index of sorts. For example, Visual Studio may present a user with a maintainability index to give them a better idea of where refactoring might be required in the code. Visual Studio measures code complexity using "Cyclomatic (control flow) complexity", reusability using a "Class Coupling" metric, Inheritance Depth and Lines of Code metrics. Visual Studio then uses all of these to establish a maintainability index. However, the maintainability index provided by Visual studio does not provide a metric related to build or runtime errors or factor in the developer's actual experience of maintaining the source code as discussed herein in accordance with some embodiments.

In particular, embodiments of the present inventive concept generate a more accurate maintainability index based on actual usage data rather than relying on syntactic and semantic analyses. For example, a DMI in accordance with embodiments of the present inventive concept may be calculated based on a combination a function's resource consumption (via a performance profiler) with its local build and compile error metric provided using the historical database of errors. The result is a more accurate estimate of each function's need for refactoring. These functions may be ranked based on their maintainability in order to plan the order in which the refactoring of the code should be completed.

As discussed above, most modern software development is performed in an integrated development environment (IDE). These environments can make a software developer more efficient. Once the code is completed and compiled, the code inevitably needs to be refactored to make the code more efficient. However, identifying which portions of the code need refactoring can be a difficult task. Accordingly, some embodiments of the present inventive concept provide a performance profiler that works in combination with an error tracker to provide a prioritized list of functions that need to be refactored in the code and a DMI for each function. The DMI factors in a developers experience when calculated, thus, providing a true picture of codes maintainability as will be discussed further herein with respect to FIGS. 1 through 10 below.

Referring first to FIG. 1, an IDE system 190 in accordance with some embodiments of the present inventive concept will be discussed. Although embodiments of the present inventive concept are discussed as being performed in an IDE, embodiments are not limited to this environment. Any environment suitable for code development may be used without departing from the scope of the present inventive concept.

As illustrated in FIG. 1, the IDE system 190 includes an IDE 150, an error tracker 115, a performance profiler 117 and a computing device 100 for interacting with the IDE 150, the error tracker 115 and the performance profiler 117. Although the IDE 150, the error tracker 115 and the performance profiler 117 in accordance with embodiments of the present inventive concept are illustrated as separate modules in FIG. 1, embodiments of the present inventive concept are not limited to this configuration. In particular, the error tracker 115 and/or the performance profiler 117 may be separate modules or plug-in modules as illustrated in FIG. 1. However, the error tracker 115 and/or the performance profiler 117 may also be included in the IDE directly as indicated by the dotted line 193 of FIG. 1. Thus, the performance profiler 117 in accordance with embodiments of the present inventive concept may operate in many ways without departing from the scope of the present inventive concept. For example, the performance profiler 117 may be configured to execute as a standalone subsystem, which can be set up to monitor particular jobs representing both product builds and executions. Alternatively, the performance profiler 117 can be configured to execute as a called service and run as part of the Source Code Management system's build job.

Referring again to FIG. 1, as illustrated therein, the IDE 150 includes a source code editor 160, a compiler 165, a debugger 170, build automation tools 175 and an interpreter 180. The IDE 150 illustrated in FIG. 1 is an example IDE and is not meant to limit embodiments of the present inventive concept. Some of the components included in the IDE may not be present or other components may be included in the IDE without departing from the scope of the present inventive concept. Furthermore, the IDE may offer intelligent code completion features. In addition to these components, some embodiments of the present inventive concept provide the error tracker 115 including an error database 185 and a data miner 187 and the performance profiler 117 configured to generate reports 119, DMIs 123, error rates 121 and the like as will be discussed further herein. The developer interacts with the IDE 150, the error tracker 115 and the performance profiler 117 via the user interface/input devices 105 of the computing device 100.

In particular, the source code editor 160 is a text editor program designed specifically for editing source code written by developers. Some source code editors are stand alone applications and may not be provided in an IDE 160. The compiler 165 is a computer program (or set of programs) that transforms the source code written in a programming language (the source language) into another computer language (the target language) to transform the source code to create an executable program/application. Build automation tools 175 are used for scripting or automating a wide variety of tasks that software developers do in their day-to-day activities including, for example, compiling computer source code into binary code, packaging binary code, running tests, deployment to production systems, creating documentation and/or release notes and the like. Typically, developers used build automation tools 175 to call compilers from inside a build script versus attempting to make the compiler calls from the command line. The interpreter 180 is a computer program that directly executes, i.e., performs, instructions written in a programming or scripting language, without previously batch-compiling them into machine language. Finally, the debugger 170 or debugging tool is a computer program that is used to test and debug programs.

Referring again to FIG. 1, the error tracker 115 as discussed in commonly assigned U.S. application Ser. No. 14/222,045 entitled DEVELOPMENT TOOLS FOR LOGGING AND ANALYZING SOFTWARE BUGS incorporated by reference above, is configured to store all errors (build or run-time in the IDE) in the error database 185 as the errors are encountered. The error tracker 115 may store two types of errors in the error database 185 compilation errors and run-time errors observed in the IDE. It will be understood that all successful compiles may also be stored in the error database 185, not just successful compiles that resolved a specific error. As used herein, "run-time errors" refers to run time errors that are diagnosed at compile time in the IDE by the developer. Each error may be stored in the error database as a separate record. Once the error database 185 is established, the error tracker 115 is configured to retrieve the historical errors and their resolutions responsive to a real time error experienced by the developer as discussed in detail in the cited application. The data miner 187 of the error tracker 115 may be used to explore the error database for error/resolution pairs having a particular relevancy score. What is considered relevant may be customizable by the developer. Thus, results don't have to be 100% relevant. It is up to the developer to judge whether what was suggested is helpful in debugging their error. The errors with the highest relevancy score are returned. Only some details are stored (error message and code) in the error database 185. The details that are stored for a resolved issue are primarily code related. Once an issue is resolved, the system is able to record the code that was changed to fix the defect. Thus, an issue can typically only be in one of two states unresolved and resolved. This is all done during product development and, thus, there is no concept of "Verification" or "Work in Progress" for the test engineers.

The performance profiler 117 in accordance with some embodiments of the present inventive concept works in combination with results stored in the error database 185 of the error tracker 115. In particular, when a profile is initiated in the performance profiler 117, the performance profiler 117 looks for the existence of a historical error database 185 for the product being executed. The performance profiler 117 may determine the product being profiled by, for example, a parameter set in the performance profiler 117 that marks the product being profiled.

The performance profiler 117 is configured to, for each function encountered by the profiler, examine the historical database 185 for errors that have occurred in that same function. High compile errors are not necessarily symptomatic of unmaintainable code. High compile errors may also be, for example, a symptom of developer inexperience. Thus, developer inexperience does not indicate a refactoring need, it is more indicative of a need for developer training. Thus, as discussed above, the present inventive concept removes local build and compile errors that are determined to be a result of developer inexperience, i.e., they are filtered out. In other words, the purpose of the inventive concept is to identify overly complex, difficult to sustain functions, not training requirements. Thus, the noise of inexperience is removed by filtering failed compiles related to developer inexperience from the DMI calculation.

In particular, in some embodiments, an average, expected error rate of local build and compile error rate is retrieved/calculated for each developer, which may be generated and maintained by the error tracker 115. During the profile, an error percentage per developer for each particular function is calculated for a given time period, for example, monthly or quarterly. The average error rate for the developer is compared to the developer's error rate for the particular function being profiled. These error rates may be stored in the performance profiler 117 in an error rates 121 file. If the local build and compile error rate for the profiled function is higher (greater than) than the developer's average local build and compile error rate, then all builds by this developer are included in the DMI calculation. In other words, it is determined that the developer is experiencing higher than normal error rates with respect to the particular function being profiled and, therefore, these compile errors should be included in the DMI.

If, on the other hand, the local build and compile error rate for the particular function being profiled is lower (less) than the developer's average local build and compile error rate, all builds by this developer are removed from the DMI calculation. In other words, it is determined that the developer is experiencing a better error rate than normal with respect to this particular function. Furthermore, any errors encountered in the database for a function that occurred prior to the first check-in date of that function, i.e. when the function was first moved into production, may also be removed from the DMI calculation. The calculated DMI for each function may be stored in the performance profiler 117 in the DMI 123 file.

The performance profiler 117 uses the remaining builds, local build and compile errors as well as successful compiles to provide a total percentage of local build and compile errors.

Results of the performance profiler 117 may be displayed to the user (developer) in many formats. For example, results may be displayed as a local build and compile error rate per function encountered in the profile run. In further embodiments, results may be displayed as a DMI per function, calculated by combining resource consumption and its local build and compile error rate. A list may be provided ranking functions based on their relative maintainability. For example, the functions, by default, may be ranked in a list from least maintainable to most maintainable.

It will be understood that data stored in both the error tracker 115 and the performance profiler 117 may be annoymized, such that, for example, the historical database records contain an annoymized developer identification (ID) and not actual developer details. For example, a unique, random ID number may be stored in the historical database records to identify the developer who encountered the error. These developer IDs are maintained and accessible only to the tool and no other developer details may be stored.

Furthermore, in addition to local build and compile errors, the historical database of errors can also record runtime errors captured by any IDE Run-time Checks (RTC) tools without departing from the scope of the present inventive concept. For example, runtime errors that are detected by a break to the debugger may also be tracked in the database. This is possible as the Historical Error Database 185 may be integrated into the IDE 150.

Thus, according to some embodiments of the present inventive concept, a more accurate estimate of refactoring needs may be provided. This is accomplished by combining performance metrics (CPU, Memory) with the developer's actual experience working with the code base. Functions with the highest resource usage and highest rate of errors may be examined and refactored first. Embodiments of the present inventive concept may be useful if, for example, development resources are tight, but a high degree of optimization still needs to be achieved. Furthermore, the developer may have more information, allowing them to make a better educated decision on what the highest priority optimization/refactoring needs are. A function that takes a higher amount of processing time and/or memory than others in the product is not necessarily inefficient or poorly written.

Figure 2:
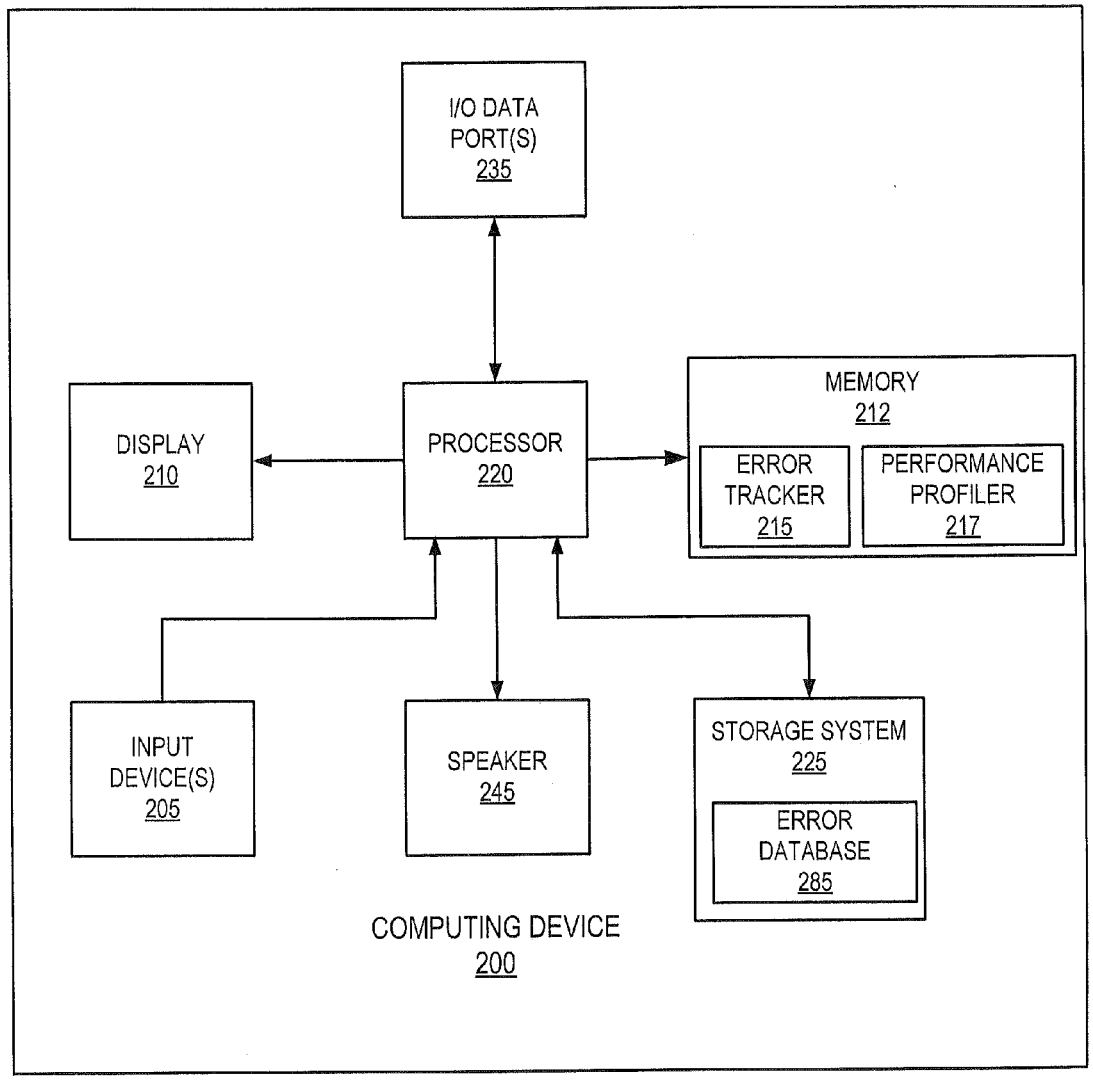
FIG. 2 is a block diagram that illustrates a computing device for use in software development in accordance with some embodiments of the present inventive concept.

Referring now to FIG. 2, a block diagram of a computing device 200 in accordance with some embodiments of the present inventive concept will be discussed. The device 200 may be used, for example, to implement the development environment 190 of FIG. 1 using hardware, software implemented with hardware, firmware, tangible computer-readable storage media having instructions stored thereon, or a combination thereof, and may be implemented in one or more computer systems or other processing systems. The computing device 200 may also be a virtualized instance of a computer. As such, the devices and methods described herein may be embodied in any combination of hardware and software.

As shown in FIG. 2, the computing device 200 may include input device(s) 205, such as a keyboard or keypad, a display 210, and a memory 215 that communicate with one or more processors 220 (generally referred to herein as "a processor"). The computing device 200 may further include a storage system 225, a speaker 245, and I/O data port(s) 235 that also communicate with the processor 220. The memory 212 may include error tracker 215 and a performance profiler 217 installed thereon. The error tracker 215 and the performance profiler 217 may be as discussed above and as described in greater detail herein.

The storage system 225 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The storage system 225 may include information used to perform various aspects of the present inventive concept. For example, the storage system may include the error database 285 discussed above with respect to FIG. 1. Although illustrated in separate blocks, the memory 212 and the storage system 225 may be implemented by a same storage medium in some embodiments. The input/output (I/O) data port(s) 235 may include a communication interface and may be used to transfer information in the form of signals between the computing device 200 and another computer system or a network (e.g., the Internet). The communication interface may include a modem, a network interface (such as an Ethernet card), a communications port, a PCMCIA slot and card, or the like. These components may be conventional components, such as those used in many conventional computing devices, and their functionality, with respect to conventional operations, is generally known to those skilled in the art. Communication infrastructure between the components of FIG. 2 may include one or more device interconnection buses such as Ethernet, Peripheral Component Interconnect (PCI), and the like.

Figure 3:
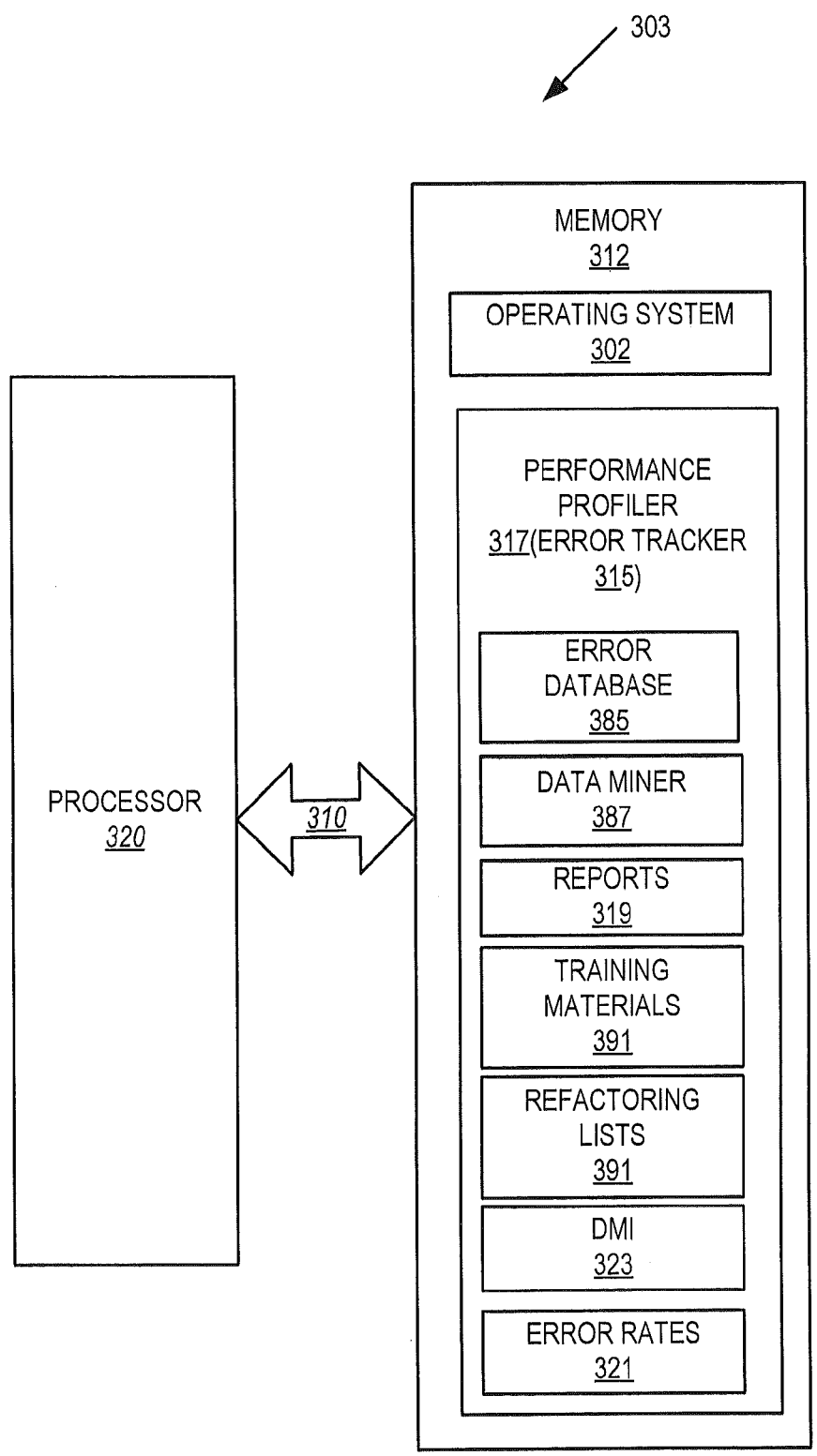
FIG. 3 is a block diagram that illustrates a software/hardware architecture for use in software development in accordance with some embodiments of the present inventive concept.

Referring now to FIG. 3, a block diagram of a computing system or environment for performance profiling in accordance with further embodiments of the present inventive concept will be discussed. In particular, FIG. 3 illustrates a processor 320 and memory 312 that may be used in computing devices or other data processing systems, such as the computing device 200 of FIG. 2 and/or the IDE system 190 of FIG. 1. The processor 320 communicates with the memory 312 via an address/data bus 310. The processor 320 may be, for example, a commercially available or custom microprocessor, including, but not limited to, digital signal processor (DSP), field programmable gate array (FPGA), application specific integrated circuit (ASIC), and multi-core processors. The memory 312 may be a local storage medium representative of the one or more memory devices containing software and data in accordance with some embodiments of the present inventive concept. The memory 312 may include, but is not limited to, the following types of devices: cache, ROM, PROM, EPROM, EEPROM, flash, SRAM, and DRAM.

As shown in FIG. 3, the memory 312 may contain multiple categories of software and/or data installed therein, including (but not limited to) an operating system block 302 and an error tracker/performance profiler 315/317. The operating system 302 generally controls the operation of the computing device or data processing system. In particular, the operating system 302 may manage software and/or hardware resources and may coordinate execution of programs by the processor 320, for example, in providing IDE of FIG. 1.

The performance profiler 317 is configured to carry out some or all of the functionality discussed above with respect to FIG. 1. In particular, the performance profiler 317 includes the error database 385 (provided by the error tracker 315), a data miner 387, reports 389, training materials 391, refactoring lists 321, DMIs 323 and error rate 321. These aspects of the present inventive concept were discussed above with respect to FIG. 1 and will be discussed further below with respect to the remaining figures. It will be understood that the modules included in the performance profiler 317 may include additional modules, modules may be combined or fewer modules may be provided without departing from the scope of the present inventive concept.

Although FIG. 3 illustrates example hardware/software architectures that may be used in a device, such as the computing device 200 of FIG. 2, to provide operations in accordance with some embodiments described herein, it will be understood that the present inventive concept is not limited to such a configuration but is intended to encompass any configuration capable of carrying out operations described herein. Moreover, the functionality of the computing device 200 of FIG. 2 and the hardware/software architecture of FIG. 3 may be implemented as a single processor system, a multi-processor system, a processing system with one or more cores, a distributed processing system, or even a network of stand-alone computer systems, in accordance with various embodiments.

Computer program code for carrying out the operations described above and/or illustrated in FIGS. 1-3 may be written in a high-level programming language, such as COBOL, Python, Java, C, and/or C++, for development convenience. In addition, computer program code for carrying out operations of the present inventive concept may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figure 4:
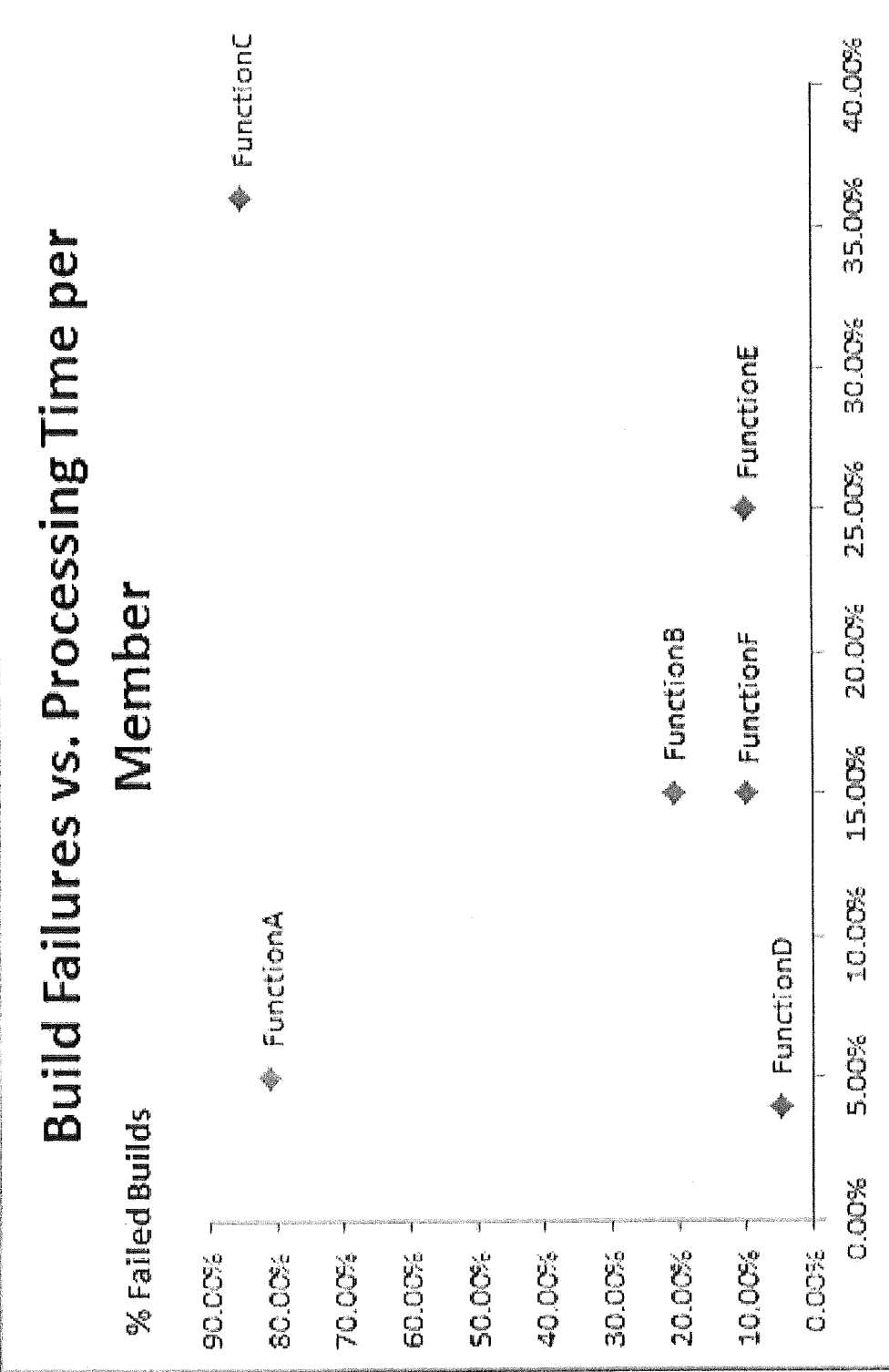
FIG. 4 is a graph illustrating build time failures vs. processing time per function produced using the performance profiler in accordance with some embodiments of the present inventive concept.

Referring now to FIG. 4, an example graph of build failures versus Processing Time per function (member) will be discussed. Thus, as discussed above, local build and compile errors vs. processing time comparison for each function (A-F) may be provided. In particular, as illustrated in FIG. 4, once a code profile is completed by the performance profiler in accordance with embodiments of the present inventive concept, function members that are both taking up more processing time (x-axis) and are resulting in more failed builds (y-axis) can be identified. FIG. 4 illustrates these aspects of six functions, Functions A, B, C, D, F and E in FIG. 4. Thus, functions that are proving difficult for developers to maintain can be identified. In particular, any function edging towards the top right hand side of the graph of FIG. 4, Function C, is a candidate for closer investigation.

Figure 5:
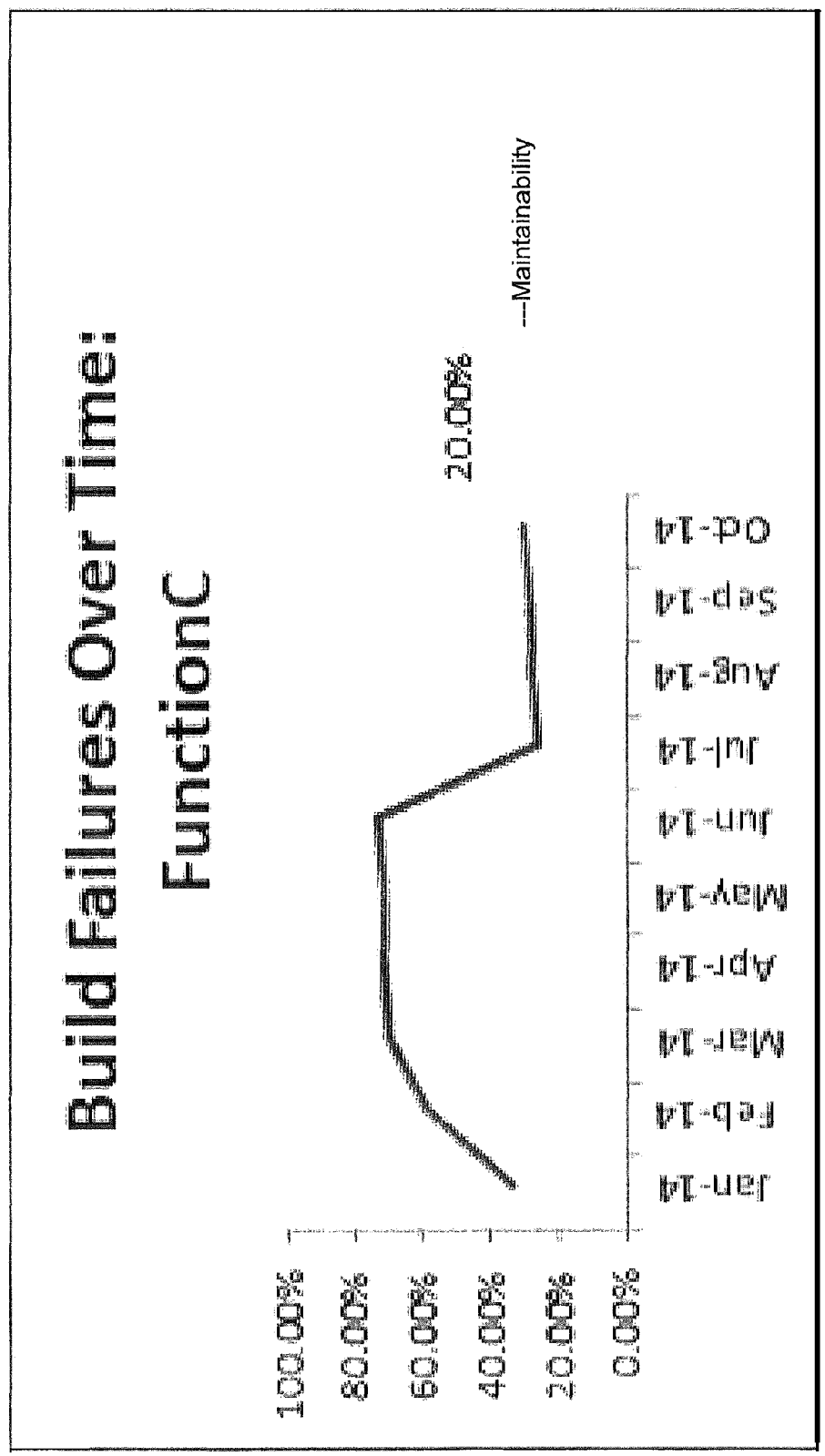
FIG. 5 is a graph illustrating build failures over time (Function C of FIG. 4) produced using the performance profiler in accordance with some embodiments of the present inventive concept.

Thus, referring now to FIG. 5, a closer look at the build failures of Function C (percentage of local build and compile errors over time when for a single function) will be discussed. For example, the graph of FIG. 4 may include hyperlinks. Once Function C is identified as problematic, i.e. both taking up more processing time and proving difficult for developers to maintain, a user can click on the Function C hyperlink in FIG. 4 and get some historical perspective to assist in diagnosing what, if any, changes could be implemented to improve Function C. For example, has the function always been difficult to maintain, was it a result of a poorly thought out previous fix and the like. As illustrated in FIG. 5, Function C's maintainability improved at first and then dropped back to 20 percent. This function may be placed at the of the list of functions to be refactored or just thrown out all together. Code profiling results may include reports on local build and compile errors as a DMI. The DMI or maintainability index may provide useful information in making this decision.

Figure 6:
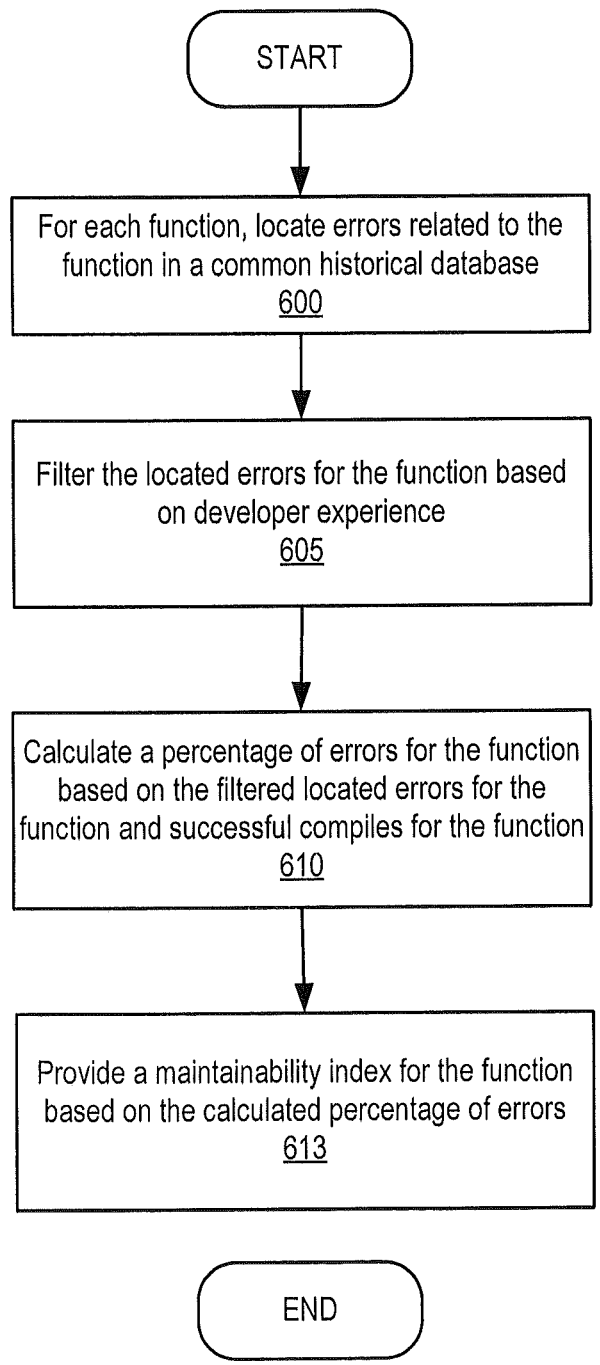
FIGS. 6-10 are flowcharts illustrating methods of calculating a maintainability index in accordance with some embodiments of the present disclosure.

Operations for performance profiling in accordance with some embodiments of the present inventive concept will now be discussed with reference to the flowcharts of FIGS. 6 through 10. Referring first to FIG. 6, operations for calculating a maintainability index begin at block 600 by locating errors related to the function in the software code in a common historical error database. Errors may be located for each function in software code for an existing software product. In some embodiments, errors may include local build errors, compile errors and runtime errors captured in a development environment. As discussed above, the historical error database may be generated by an error tracker. The located errors for each function may be filtered based on developer experience (block 605). As discussed above, high compile errors are not necessarily symptomatic of unmaintainable code, they could also be a result of developer inexperience. Developer inexperience is not indicative of a refactoring need, but a need for training. Embodiments of the present inventive concept are directed to identifying overly complex, difficult to sustain functions in existing code, not training requirements. Thus, embodiments of the present inventive concept remove the noise of inexperience from the DMI calculation. For example, failed compiles related to developer inexperience may be removed from the DMI calculation. A percentage of errors for the function based on the filtered located errors for the function and successful compiles for the function (block 610) is calculated. A DMI (maintainability index) is provided for the function based on the calculated percentage of errors (block 613). It will be understood that in some embodiments, locating may be preceded by receiving a request to profile the software code for the existing software product at a performance profiler.

Figure 7:
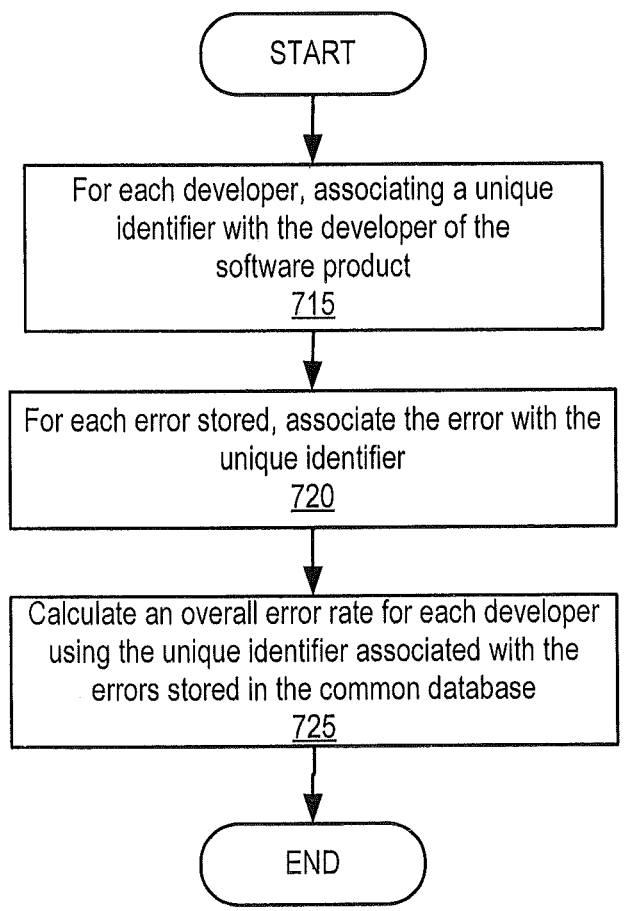

Referring now to the flowchart of FIG. 7, operations for calculating a maintainability index may further include associating a unique identifier with the developer of the software product (block 715). Thus, the information stored in the database is stored using the unique identifier, not the developer's name, thus, anonymizing the developer information. Each error stored in the common historical database is associated with the unique identifier of the developer that received the error (block 720). An overall error rate for each developer is calculated using the unique identifier associated with the errors stored in the common historical database (block 725). Thus, each developer has a general overall error rate for all programming in all products. This general error rate can be used to determine if the error rate experienced on a particular function is out of line with a developers usual performance as will be discussed below.

Figure 8:
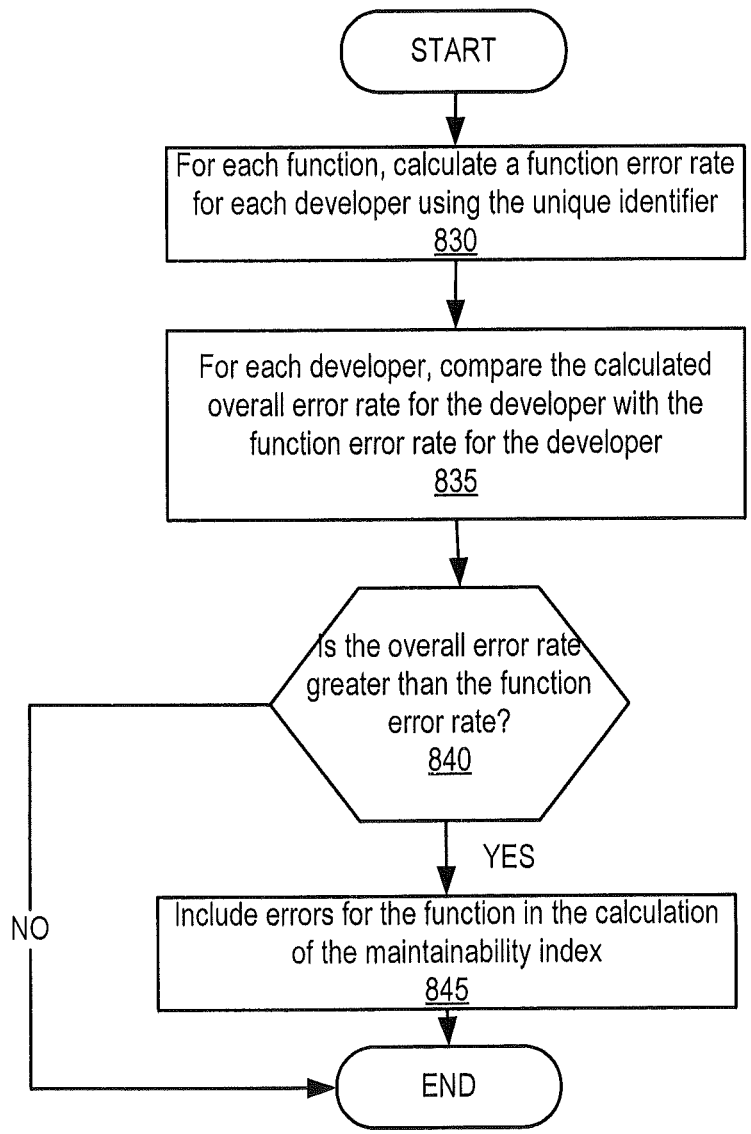

Referring now to the flowchart of FIG. 8, operations for filtering the located errors for the function based on the developer experience may begin at block 830 by, for each function in the software code, calculating a function error rate for each developer using the unique identifier associated with the errors stored in the common historical database. Thus, a function error rate is calculated for each developer for each function. As used herein, an "overall error rate" refers to a developers error rate on all software code. A "functional error rate" refers to a particular error rate for the developer for a particular function. For each developer, the developer's calculated overall error rate is compared with the developer's function error rate (block 835). It is determined if the overall error rate is greater than the function error rate (block 840). If the overall error rate is greater than the function error rate (block 840), then the errors for this developer are included in the calculation of the maintainability index (block 845). If, on the other hand, the overall error rate is less than the function error rate (block 840), the errors for this developer are not included in the calculation of the maintainability index, i.e., these errors are factored out. Thus, the maintainability index for the function is calculated using the errors for the function associated with the developer if the function error rate for the developer is greater than the overall error rate for the developer (block 845).

In some embodiments, filtering may further include excluding from the calculation of the maintainability index errors for a function that occurred prior to a first date of production for the function.

Figure 9:
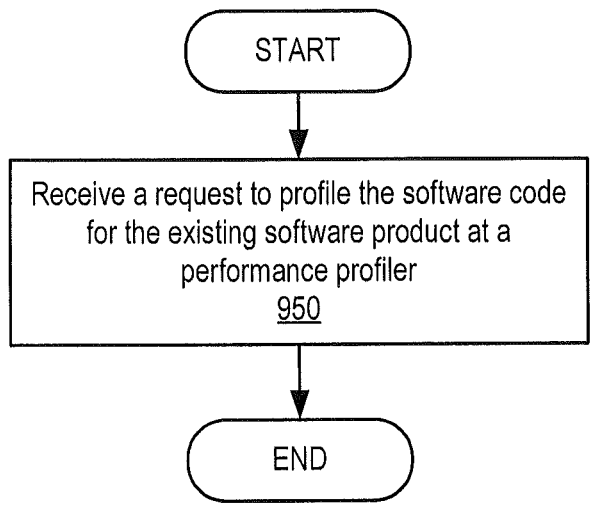

Referring now to the flowchart of FIG. 9, operations for calculating the maintainability index continue by excluding the errors for the function associated with the developer if the function error rate for the developer is less than the overall error rate for the developer (block 950).

Figure 10:
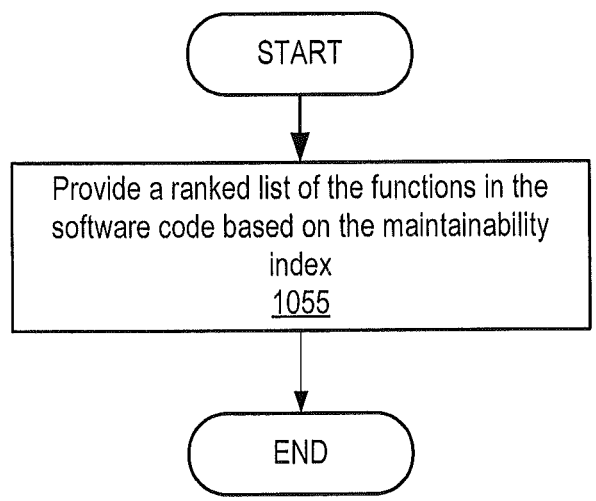

Referring finally to the flowchart of FIG. 10, some embodiments of the present inventive concept may provide a ranked list of the functions in the software code based on the maintainability index. The maintainability index may provide an indication of a refactoring need of the function associated therewith (block 1055).

Thus, some embodiments of the present inventive concept provide a performance profiler that allows calculation of a maintainability index for each software function in the software product by acquiring a local build and compile error metric and factoring out of developer experience from the metric. As discussed herein, using this metric, functions may be ranked functions by their refactoring needs. Thus, the user (developer) may be given a more prioritized picture of refactoring needs by presenting a ranked list of the most unmaintainable functions in the software product, which may be accomplished by combining the function compile and runtime error frequency with its resource consumption as discussed in detail above.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of any means or step plus function elements in the claims below are intended to include any disclosed structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of calculating a maintainability index, the method comprising:
    for each function in software code for an existing software product, locating errors related to the function in the software code in a common historical error database;
    filtering the located errors for the function based on developer experience;
    calculating a percentage of errors for the function based directly on the filtered located errors for the function and successful compiles for the function;
    providing a maintainability index for the function based on the calculated percentage of errors using developer experience as a direct factor in calculating the maintainability index, wherein providing the maintainability index comprises one of calculating the maintainability index for the function using the errors for the function associated with the developer if a function error rate for the developer is greater than an overall error rate for the developer and excluding the errors for the function associated with the developer if the function error rate for the developer is less than the overall error rate for the developer; and
    providing a ranked list of the functions in the software code based on the maintainability index, wherein the maintainability index provides an indication of a refactoring need of the function associated therewith.

2. The method of claim 1, further comprising:
    for each developer of the software product, associating a unique identifier with the developer of the software product;
    for each error stored in the common historical database, associating the error with the unique identifier of the developer that received the error; and
    calculating the overall error rate for each developer using the unique identifier associated with the errors stored in the common historical database.

3. The method of claim 2, wherein filtering the located errors for the function based on the developer experience comprises:
    for each function in the software code, calculating the function error rate for each developer using the unique identifier associated with the errors stored in the common historical database; and
    for each developer, comparing the calculated overall error rate for the developer with the function error rate for the developer.

4. The method of claim 2, wherein the unique identifier associated with the developer anonymizes the developer.

5. The method of claim 1, wherein locating is preceded by receiving a request to profile the software code for the existing software product at a performance profiler.

6. The method of claim 1, wherein filtering further comprises excluding from the calculation of the maintainability index errors for a function that occurred prior to a first date of production for the function.

7. The method of claim 1, wherein errors comprise local build errors, compile errors and runtime errors captured in a development environment.

8. A computer system for calculating a maintainability index, the system comprising:
    a processor; and
    a memory coupled to the processor and comprising computer readable program code that when executed by the processor causes the processor to perform operations comprising:
        for each function in software code for an existing software product, locating errors related to the function in the software code in a common historical error database;
        filtering the located errors for the function based directly on developer experience;
        calculating a percentage of errors for the function based on the filtered located errors for the function and successful compiles for the function; and
        providing a maintainability index for the function based on the calculated percentage of errors using developer experience as a direct factor in calculating the maintainability index, wherein providing a maintainability index comprises one of calculating the maintainability index for the function using the errors for the function associated with the developer if the function error rate for the developer is greater than the overall error rate for the developer and excluding the errors for the function associated with the developer if the function error rate for the developer is less than the overall error rate for the developer,
    wherein the processor further perform operations comprising providing a ranked list of the functions in the software code based on the maintainability index, wherein the maintainability index provides an indication of a refactoring need of the function associated therewith.

9. The system of claim 8, wherein the processor further perform operations comprising:
    for each developer of the software product, associating a unique identifier with the developer of the software product;
    for each error stored in the common historical database, associating the error with the unique identifier of the developer that received the error; and
    calculating the overall error rate for each developer using the unique identifier associated with the errors stored in the common historical database.

10. The system of claim 9, wherein filtering the located errors for the function based on the developer experience comprises:
    for each function in the software code, calculating the function error rate for each developer using the unique identifier associated with the errors stored in the common historical database; and
    for each developer, comparing the calculated overall error rate for the developer with the function error rate for the developer.

11. The system of claim 9, wherein the unique identifier associated with the developer anonymizes the developer.

12. The system of claim 8, wherein locating is preceded by receiving a request to profile the software code for the existing software product at a performance profiler.

13. The system of claim 8, wherein filtering further comprises excluding from the calculation of the maintainability index errors for a function that occurred prior to a first date of production for the function.

14. The system of claim 8, wherein errors comprise local build errors, compile errors and runtime errors captured in a development environment.

15. A computer program product for calculating a maintainability index, the computer program product comprising:
a non-transitory computer readable storage medium having computer readable program code embodied in the medium, the computer readable program code comprising:
for each function in software code for an existing software product, computer readable program code to locate errors related to the function in the software code in a common historical error database;
computer readable program code to filter the located errors for the function based directly on developer experience;
computer readable program code to calculate a percentage of errors for the function based on the filtered located errors for the function and successful compiles for the function;
computer readable program code to provide a maintainability index for the function based on the calculated percentage of errors using developer experience as a direct factor in calculating the maintainability index, wherein the computer readable program code to provide comprises computer readable program code to one of calculate the maintainability index for the function using the errors for the function associated with the developer if the function error rate for the developer is greater than the overall error rate for the developer and exclude the errors for the function associated with the developer if the function error rate for the developer is less than the overall error rate for the developer; and
computer readable program code to provide a ranked list of the functions in the software code based on the maintainability index, wherein the maintainability index provides an indication of a refactoring need of the function associated therewith.

16. The computer program product of claim 15, further comprising:
for each developer of the software product, computer readable program code to associate a unique identifier with the developer of the software product;
for each error stored in the common historical database, computer readable program code to associate the error with the unique identifier of the developer that received the error; and
computer readable program code to calculate an overall error rate for each developer using the unique identifier associated with the errors stored in the common historical database;
wherein the computer readable program code to filter the located errors for the function based on the developer experience comprises:
for each function in the software code, computer readable program code to calculate a function error rate for each developer using the unique identifier associated with the errors stored in the common historical database; and
for each developer, computer readable program code to compare the calculated overall error rate for the developer with the function error rate for the developer.

* * * * *